United States Patent
Donovan (10) Patent No.: US 7,677,852 B2
(45) Date of Patent: *Mar. 16, 2010

(54) MULTI-LOBULAR LOCKBOLT (75) Inventor: Steven P. Donovan, Roscoe, IL (US)

(73) Assignee: Acument Intellectual Properties, LLC, Troy, MI (US)

( * ) Notice: Subject to any disclaimer, the term of this patent is extended or adjusted under 35 U.S.C. 154(b) by 148 days.

This patent is subject to a terminal disclaimer.

(21) Appl. No.: 11/146,678

(22) Filed: Jun. 7, 2005

(65) Prior Publication Data

US 2006/0045650 A1 Mar. 2, 2006

Related U.S. Application Data (60) Provisional application No. 60/605,704, filed on Aug. 30, 2004.

(51) Int. Cl.
*F16B 29/00* (2006.01)
(52) U.S. Cl. .................... 411/361; 411/416
(58) Field of Classification Search ........... 411/361, 411/416, 308–310
See application file for complete search history.

(56) References Cited

U.S. PATENT DOCUMENTS

| | | | |
|---|---|---|---|
| 2,114,493 A | 4/1938 | Huck | |
| 2,531,048 A | 11/1950 | Huck | |
| 2,531,049 A | 11/1950 | Huck | |
| 2,789,619 A | 4/1957 | Wing et al. | |
| 2,955,505 A | 10/1960 | Schuster | |
| 3,025,730 A | 3/1962 | Brilmyer et al. | |
| 3,139,786 A * | 7/1964 | Ardell | 411/361 |
| 3,204,331 A | 9/1965 | Looker | |
| 3,215,024 A | 11/1965 | Brilmyer et al. | |
| 3,290,982 A | 12/1966 | Marschner | |
| 3,421,562 A * | 1/1969 | Orloff et al. | 411/336 |
| 3,803,793 A | 4/1974 | Dahl | |
| 3,850,074 A * | 11/1974 | Simons | 411/416 |
| 3,875,780 A | 4/1975 | Cochrum et al. | |
| 3,915,053 A | 10/1975 | Ruhl | |
| 3,935,785 A | 2/1976 | Lathom | |
| 4,012,828 A | 3/1977 | Dahl | |
| 4,176,436 A | 12/1979 | McCombs et al. | |
| 4,198,895 A | 4/1980 | Ruhl | |
| 4,221,152 A | 9/1980 | Jason | |
| 4,250,733 A | 2/1981 | Ruhl et al. | |
| 4,299,519 A | 11/1981 | Corbett | |

(Continued)

*Primary Examiner*—Flemming Saether
(74) *Attorney, Agent, or Firm*—Trexler, Bushnell, Giangiorgi, Blackstone & Marr, Ltd (57) ABSTRACT

A lockbolt which includes a head portion and a shaft which extends from the head portion. The shaft includes at least a portion which is threaded and has a multi-lobular profile. A collar is swageable onto the multi-lobular threaded portion, and thereafter the lobes provide that the collar does not tend to vibrate loose from the threading. The fact that the section which has a multi-lobular profile is also threaded provides that the collar (or a conventional threaded nut) can be selectively rotatably removed and re-installed on the lockbolt. Before swaging, the collar may initially include a cylindrical bore, or a bore which is multi-faceted, preferably generally corresponding to the profile of the multi-lobular portion of the lockbolt. The lockbolt may also include a frangible pintail, wherein the multi-lobular threaded portion is disposed between the head portion of the bolt and the frangible pintail.

8 Claims, 10 Drawing Sheets

U.S. PATENT DOCUMENTS

| | | | |
|---|---|---|---|
| 4,408,936 A * | 10/1983 | Williamson | 411/3 |
| 4,472,096 A | 9/1984 | Ruhl et al. | |
| 4,554,838 A | 11/1985 | Paus | |
| 4,587,829 A | 5/1986 | Sukharevsky | |
| 4,597,263 A | 7/1986 | Corbett | |
| 4,615,206 A | 10/1986 | Rosier | |
| 4,681,496 A * | 7/1987 | Fasolino | 411/361 |
| 4,712,333 A | 12/1987 | Lofton | |
| 4,790,703 A * | 12/1988 | Wing | 411/260 |
| 4,796,455 A | 1/1989 | Rosier | |
| 4,807,348 A | 2/1989 | Kaelin et al. | |
| 4,813,261 A | 3/1989 | Rosier | |
| 4,813,834 A | 3/1989 | Smith | |
| 4,852,376 A | 8/1989 | Suhov | |
| 4,867,625 A | 9/1989 | Dixon | |
| 4,878,372 A | 11/1989 | Port et al. | |
| 4,896,522 A | 1/1990 | Rosier | |
| 4,943,196 A * | 7/1990 | Dahl | 411/361 |
| 4,977,663 A | 12/1990 | Hurd | |
| 4,979,279 A * | 12/1990 | Garvey | 29/252 |
| 5,049,016 A | 9/1991 | Nordyke | |
| 5,090,852 A | 2/1992 | Dixon | |
| 5,167,327 A | 12/1992 | Mondello | |
| 5,171,115 A | 12/1992 | McWilliams et al. | |
| 5,178,502 A | 1/1993 | Sadri | |
| 5,213,460 A | 5/1993 | Sadri et al. | |
| 5,228,610 A | 7/1993 | Spence | |
| 5,315,755 A | 5/1994 | Fulbright et al. | |
| 5,527,140 A | 6/1996 | Mages et al. | |
| 5,548,889 A | 8/1996 | Smith et al. | |
| 5,598,619 A | 2/1997 | Rosier | |
| 5,604,968 A | 2/1997 | Fulbright et al. | |
| 5,697,521 A | 12/1997 | Dixon | |
| 6,058,598 A | 5/2000 | Dixon et al. | |
| 6,233,802 B1 | 5/2001 | Fulbright | |
| 6,375,401 B1 * | 4/2002 | McNeill | 411/416 |
| 6,516,510 B1 | 2/2003 | Fulbright | |

* cited by examiner

MULTI-LOBULAR LOCKBOLT

RELATED APPLICATION (PRIORITY CLAIM)

This application claims the benefit of U.S. Provisional Application Ser. No. 60/605,704, filed Aug. 30, 2004.

BACKGROUND

The present invention generally relates to lockbolts, and more specifically relates to a multi-lobular lockbolt which is configured to be installed vis-a-vis a collar which is swaged onto the bolt.

Figure 1:
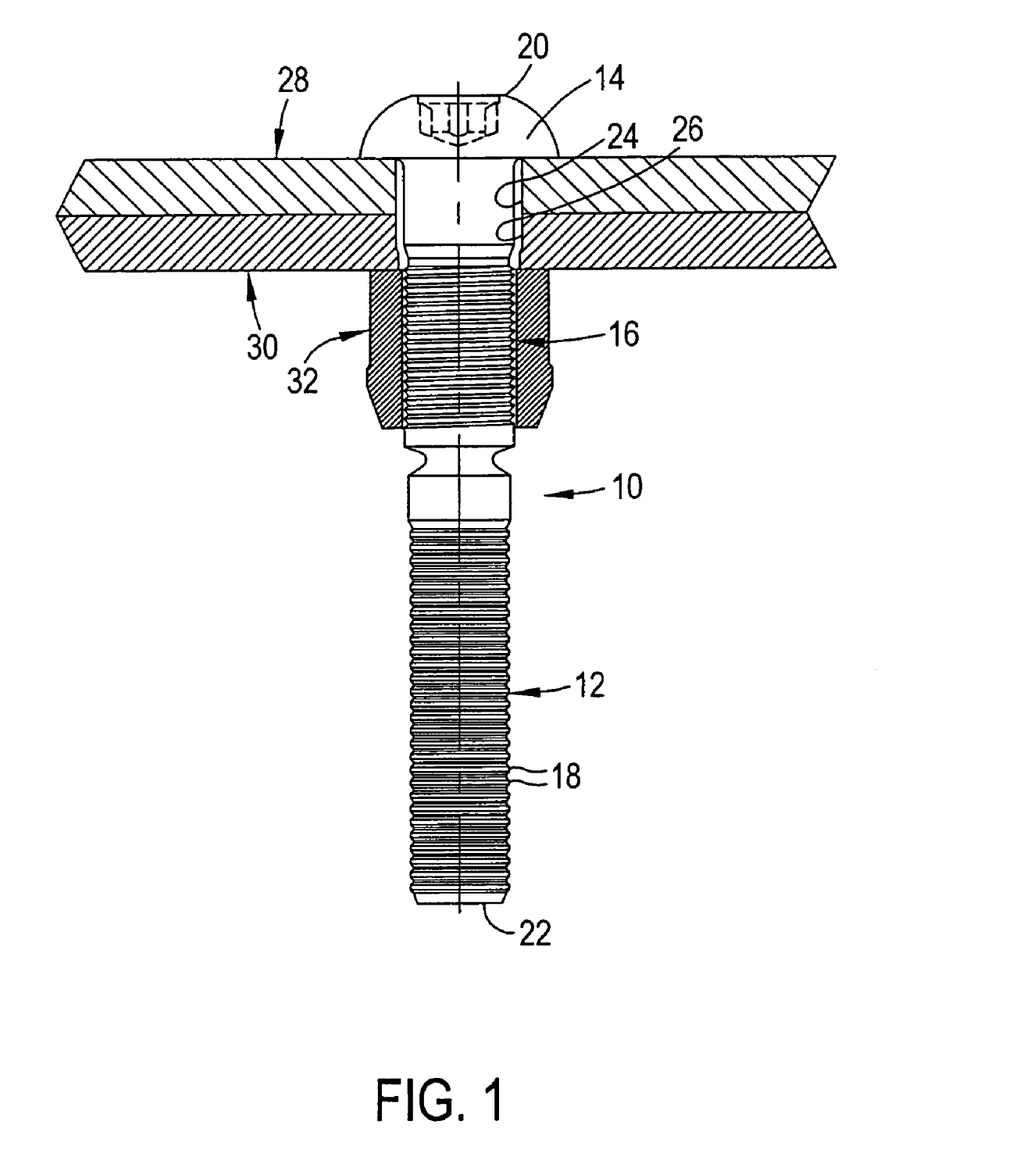
FIG. 1 illustrates a prior art lockbolt having a head, a helically-threaded shaft portion and a frangible pintail, showing a collar positioned proximate the helically-threaded shaft portion, before swaging.
Figure 2:
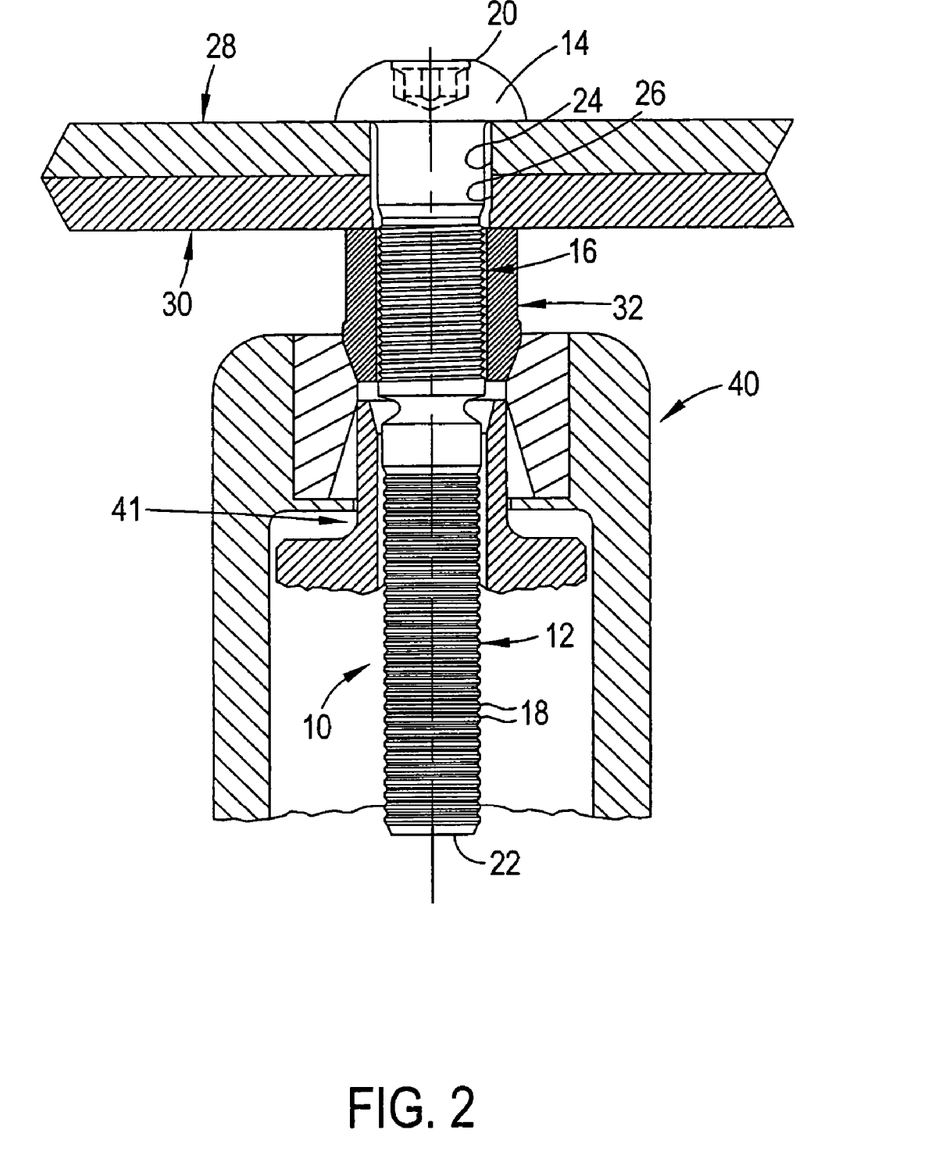
FIGS. 2 through 4 illustrate installation of the lockbolt shown in FIG. 1.
Figure 3:
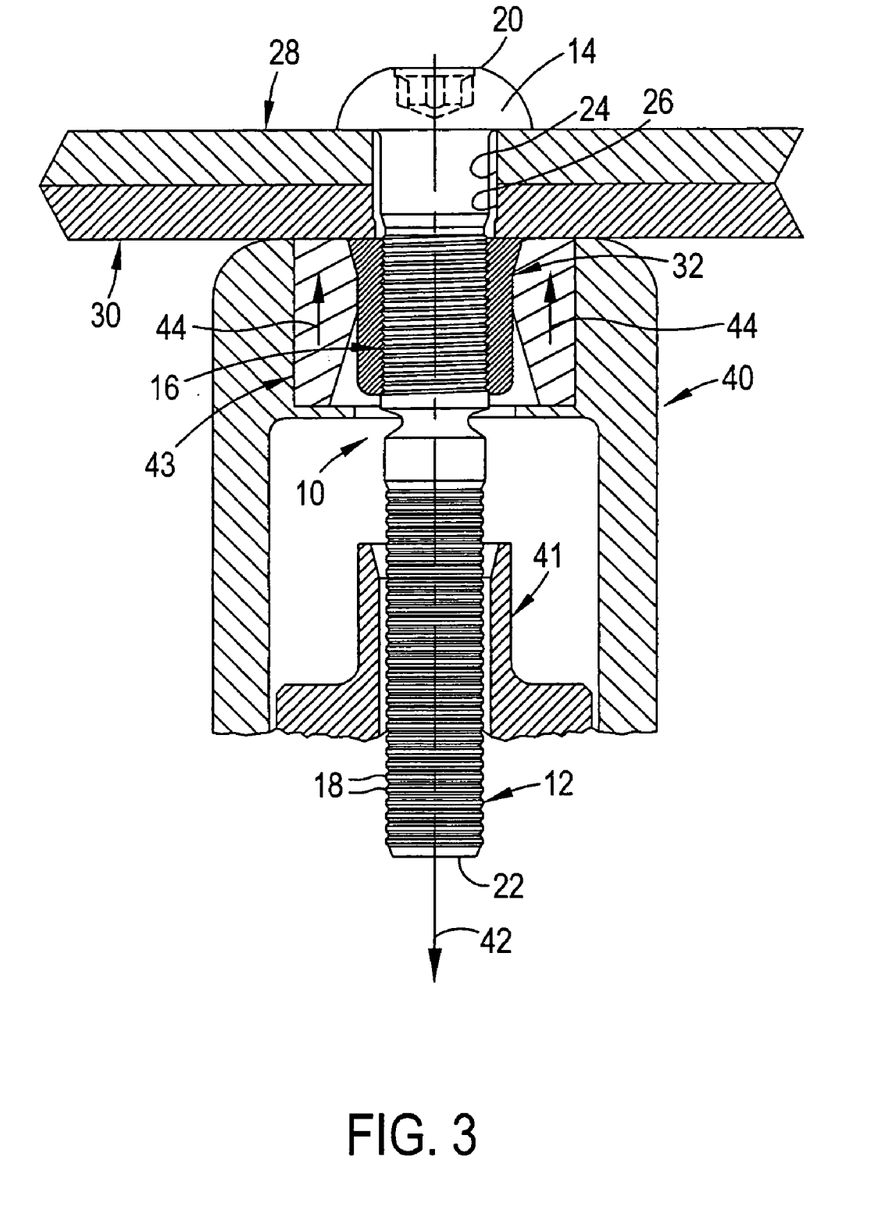
Figure 4:
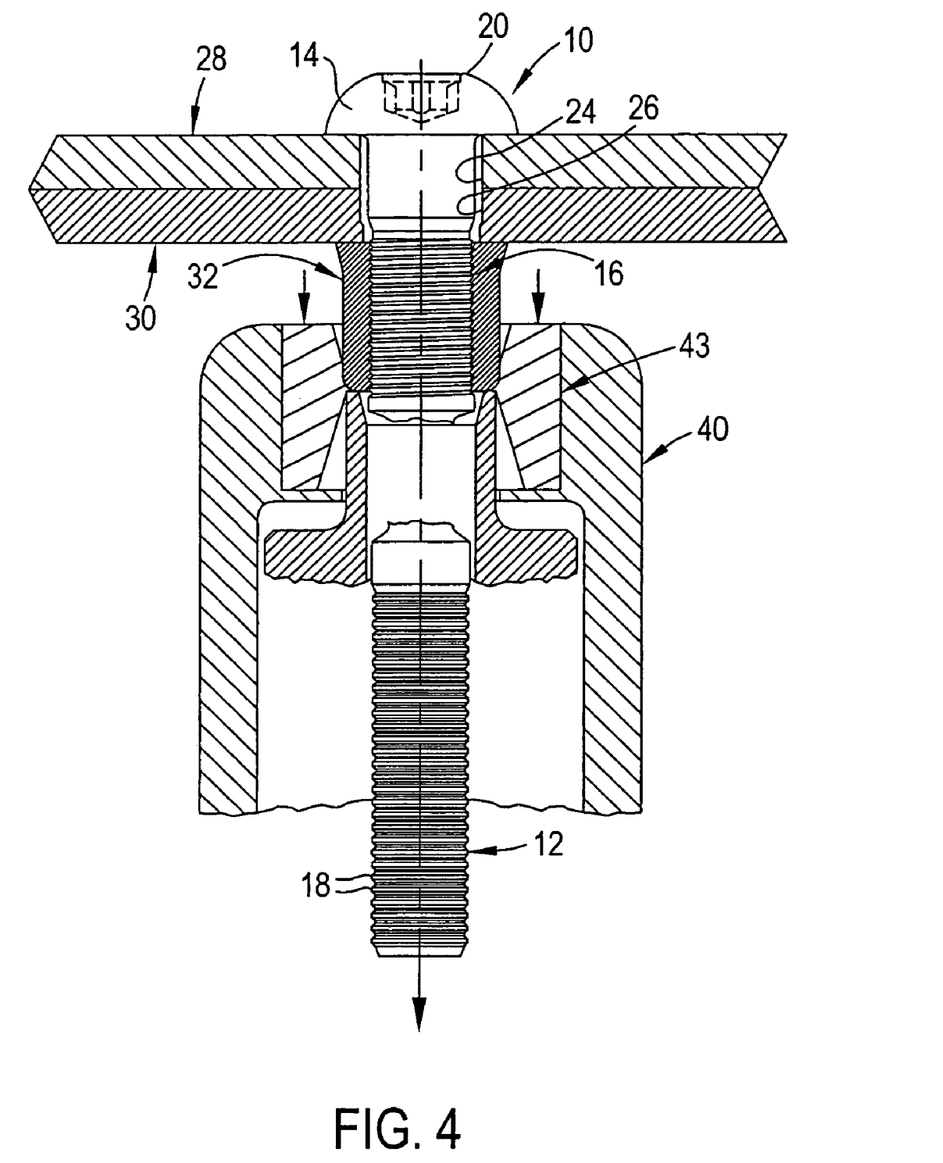

Some conventional lockbolts include a frangible pintail while others do not. As shown in FIG. 1, a typical lockbolt 10 which includes a frangible pintail 12 includes: a head 14, a threaded shaft 16 and a frangible pintail 12 having annular ribs 18, wherein the head 14 is at one end 20 of the bolt 10, the frangible pintail 12 is at the other end 22 of the bolt 10, and the threaded shaft portion 16 is disposed between the head 14 and the frangible pintail 12. As shown in FIG. 1, initially the frangible pintail 12 and threaded shaft 16 is inserted through apertures 24, 26 provided in two or more work pieces 28, 30, and a collar 32 is slid onto the bolt 10, positioned proximate the threaded shaft 16. Then, as shown in FIG. 2, an installation tool 40 is engaged with the collar 32 and the frangible pintail 12. Specifically, as shown in FIG. 3, jaws 41 of the installation tool 40 grip and pull on the pintail 12 (as represented by arrow 42) while an anvil 43 of the installation tool 40 pushes down on the collar 32 (as represented by arrows 44), causing the collar 32 to swage down onto the bolt 10. The swaging causes the collar 32 to deform and generally grip onto the threaded shaft portion 16 of the bolt 10. Once the collar 32 has been swaged, the pintail 12 continues to be pulled until it breaks off, as shown in FIG. 4, leaving the bolt 10 installed in the work pieces 28, 30, secured by the collar 32. Similarly, if the lockbolt is provided as being of the type which does not include a frangible pintail, the threaded portion of the bolt is gripped and pulled as the collar is swaged, and once the collar has been fully swaged, the bolt is released leaving the threads undamaged.

Such lockbolts and tools for installing such lockbolts are generally known in the art. For example, a typical tool for installing lockbolts with frangible pintails is disclosed in U.S. Pat. No. 2,114,493, and includes an anvil for swaging the collar and jaws for gripping and pulling on the pintail.

The threads of some prior art lockbolts, such as that which is shown in FIGS. 1-4, are helical. Regardless of whether the lockbolt includes a frangible pintail or not, the helical threads provide that once the lockbolt has been installed (i.e., the collar has been swaged onto the bolt), the collar can be rotated off of the lockbolt, and thereafter can be threaded back on to the lockbolt (or a new nut threaded onto the lockbolt). A problem associated with providing a lockbolt having standard helical threads is that the collar, once swaged onto the lockbolt, is susceptible to vibrating loose.

U.S. Pat. No. 2,531,048 discloses a lockbolt which tends to solve this problem. The lockbolt, instead of including standard helical threads, includes annular ribs. Being annular rather than helical provides that once a collar is swaged onto the ribs, the collar is not susceptible to vibrating loose. However, the lockbolt presents a new disadvantage: once a collar is swaged onto the ribs, the collar must be broken off of the ribs, rather than be rotated off the ribs. As such, the collar cannot be removed and rotated back onto the lockbolt. In fact, due to the ribs being annular, even a new collar cannot be threaded onto the lockbolt. Instead, the swaging process must be repeated to re-secure the lockbolt.

OBJECTS AND SUMMARY

An object of an embodiment of the present invention is provide a lockbolt which provides that, after installation, a collar does not tend to vibrate loose, yet the collar can be selectively rotatably removed and re-installed on the lockbolt.

Briefly, and in accordance with at least one of the foregoing objects, an embodiment of the present invention provides a lockbolt which includes a head portion and a shaft which extends from the head portion. The shaft includes at least a portion which is threaded and has a multi-lobular profile. A collar is swageable onto the multi-lobular threaded portion, and thereafter the lobes or high points provide that the collar does not tend to vibrate loose from the threading. The fact that the section which has a multi-lobular profile is also threaded provides that the collar can be selectively rotatably removed and re-installed on the lockbolt (or that a conventional threaded nut can be installed on the lockbolt once the swaged collar has been removed). Before swaging, the collar may initially include a cylindrical bore, or a bore which is multi-faceted, preferably generally corresponding to the profile of the multi-lobular portion of the lockbolt. The lockbolt may also include a frangible pintail, wherein the multi-lobular threaded portion is disposed between the head portion of the bolt and the frangible pintail. The frangible pintail may be provided as having annular ribs. Alternatively, the frangible pintail may be provided as having the same threading as the multi-lobular threaded portion of the lockbolt.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DESCRIPTION

While the present invention may be susceptible to embodiment in different forms, there are shown in the drawings, and herein will be described in detail, embodiments thereof with the understanding that the present description is to be considered an exemplification of the principles of the invention and is not intended to limit the invention to that as illustrated and described herein.

Figure 5:
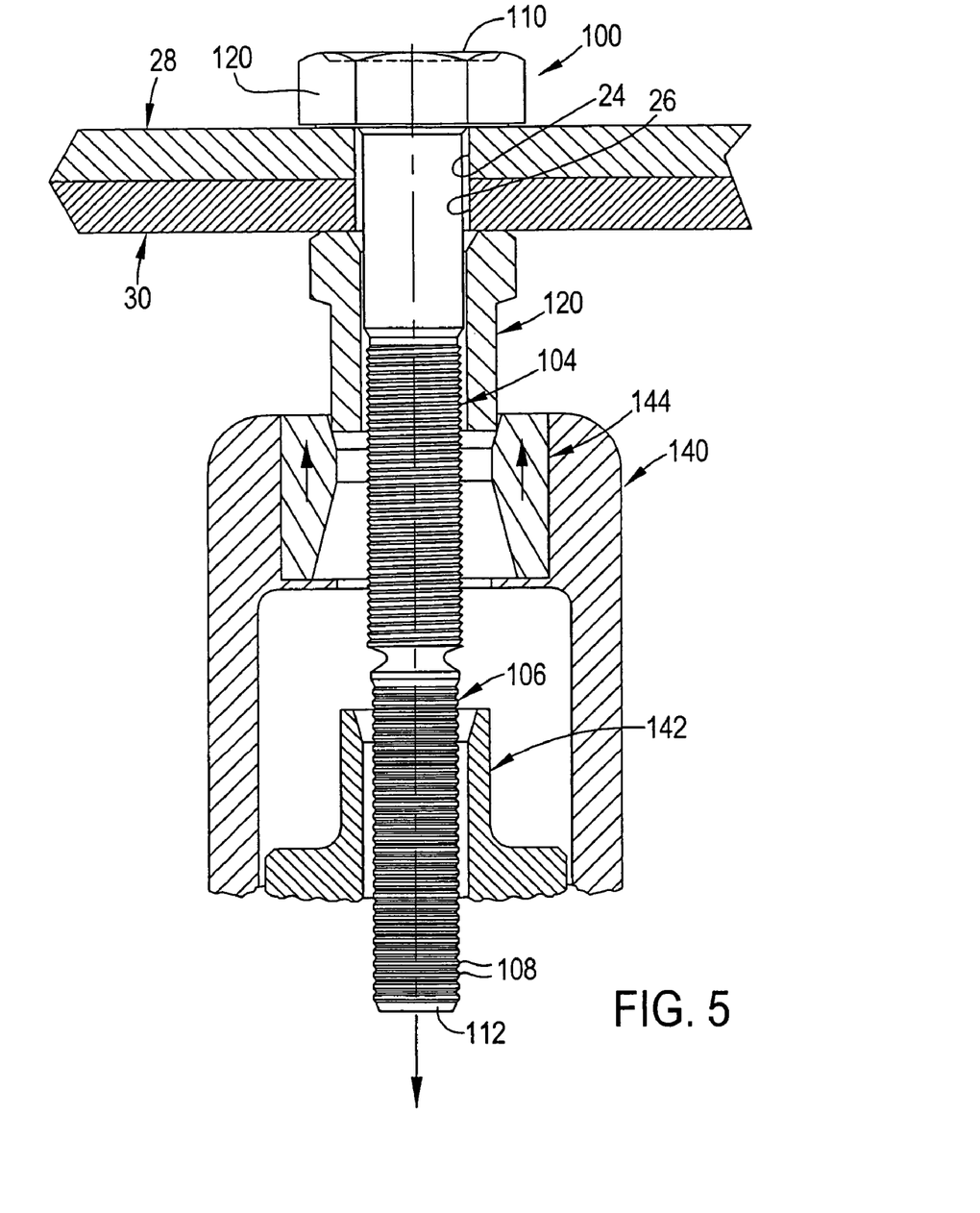
FIGS. 5 through 7 illustrate installation of a lockbolt which is in accordance with an embodiment of the present invention.
Figure 6:
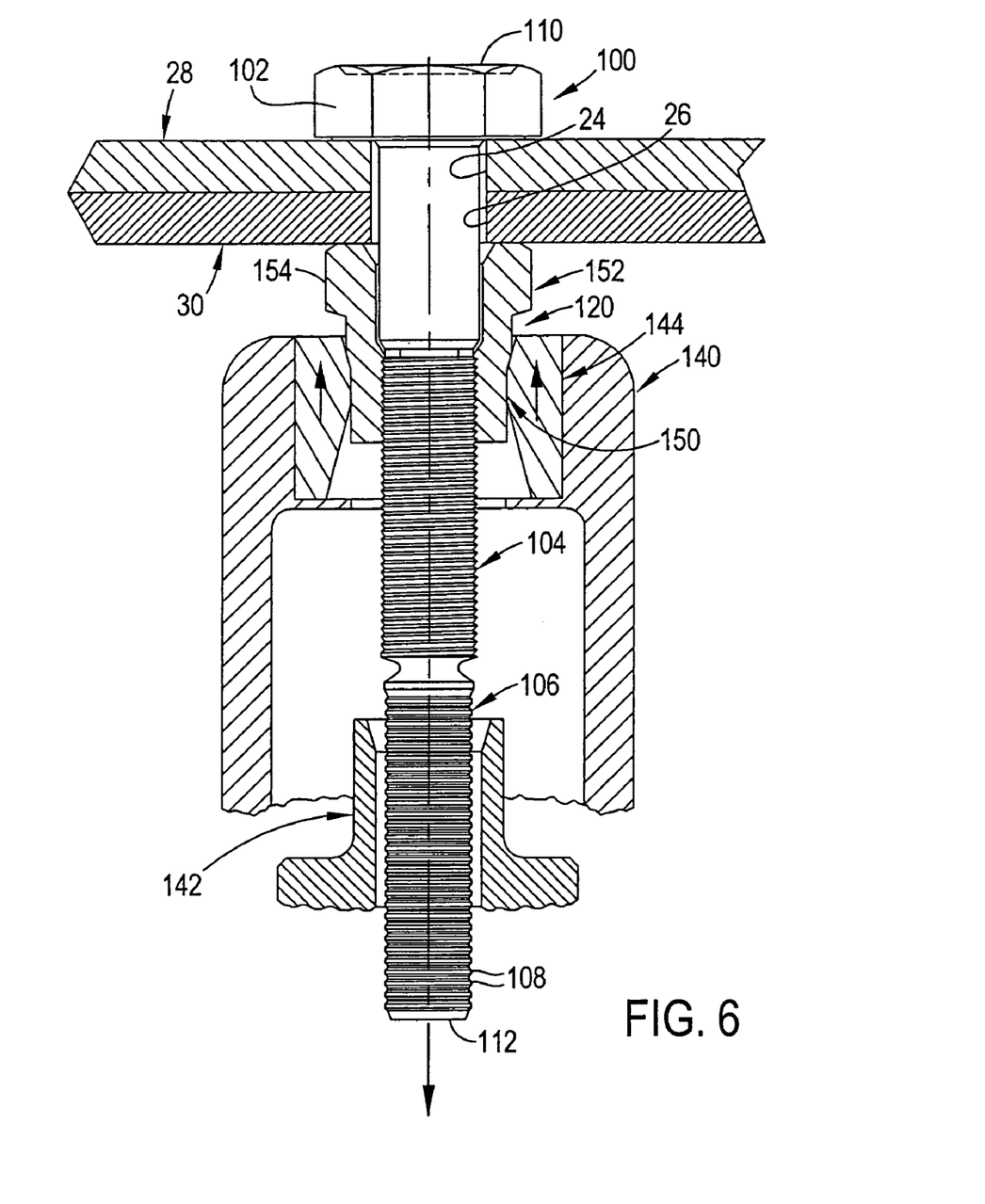
Figure 7:
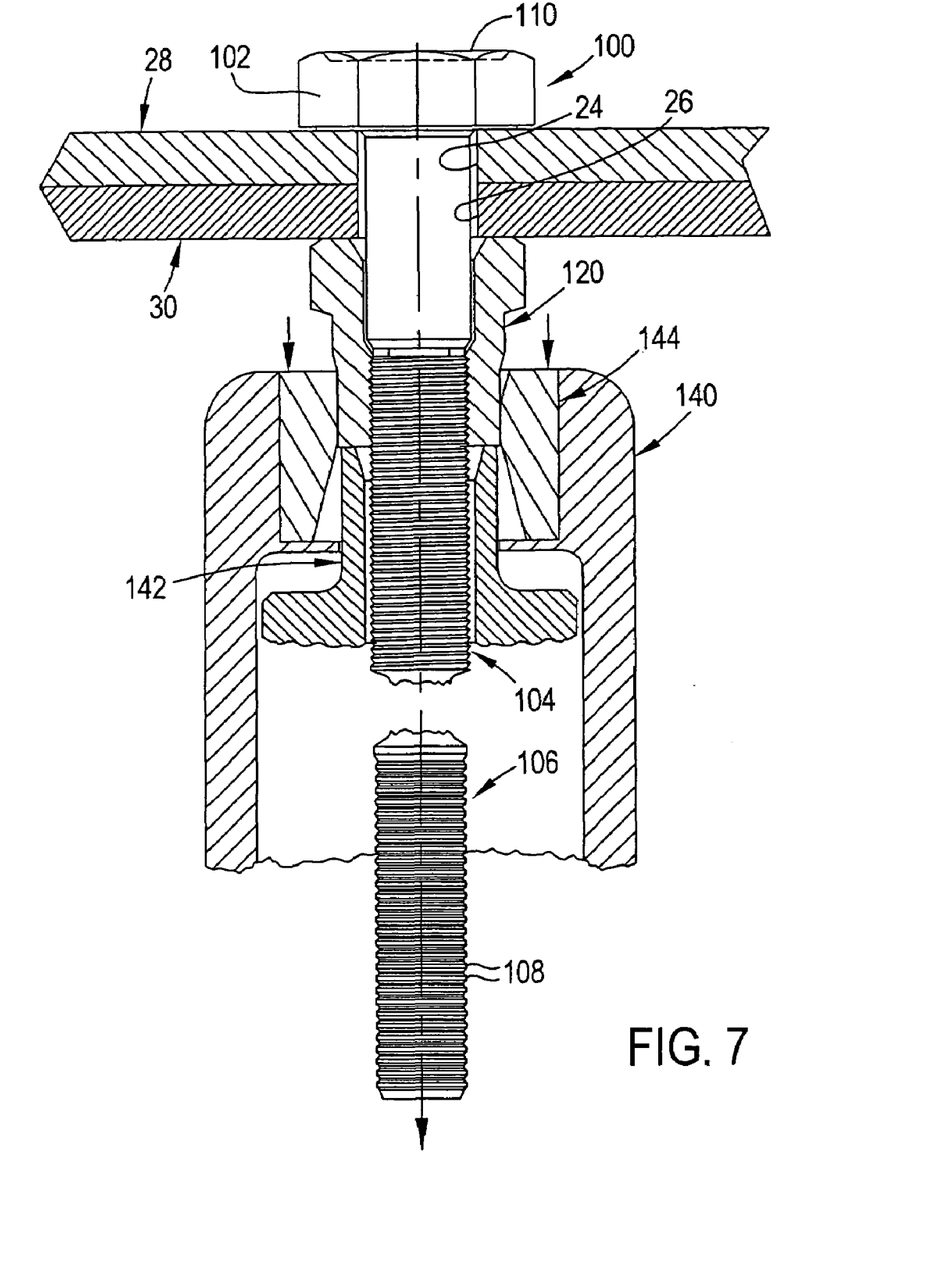

FIGS. 5 through 7 illustrate a lockbolt 100 which is in accordance with an embodiment of the present invention. The lockbolt 100 is similar to the prior art lockbolt 10 shown in FIGS. 1 through 4 in that the lockbolt 100 includes a head 102, a threaded shaft 104 and a frangible pintail 106 having annular ribs 108, wherein the head 102 is at one end 110 of the bolt 100, the frangible pintail 106 is at the other end 112 of the bolt 100, and the threaded shaft portion 104 is disposed between the head 102 and the frangible pintail 106. The difference between the lockbolt 100 shown in FIGS. 5 through 7 and the prior art lockbolt 10 shown in FIGS. 1 through 4 resides in the fact that in the lockbolt 100 shown in FIGS. 5 through 7, the threaded shaft portion 104 is not merely helically threaded, but rather includes a threaded portion which is multi-lobular or multi-faceted, meaning that the thread includes high points 114 and low points 116 as shown in FIGS. 8-10.

Figure 8:
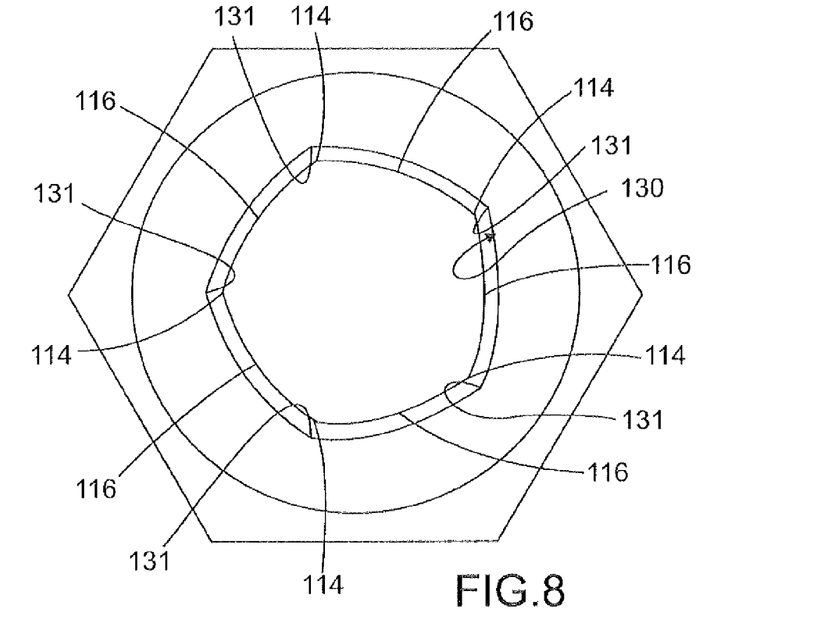
FIG. 8 provides a view (similar to a cross-sectional view) of the lockbolt and collar, before swaging, wherein the collar is provided as having a multi-faceted bore.
Figure 9:
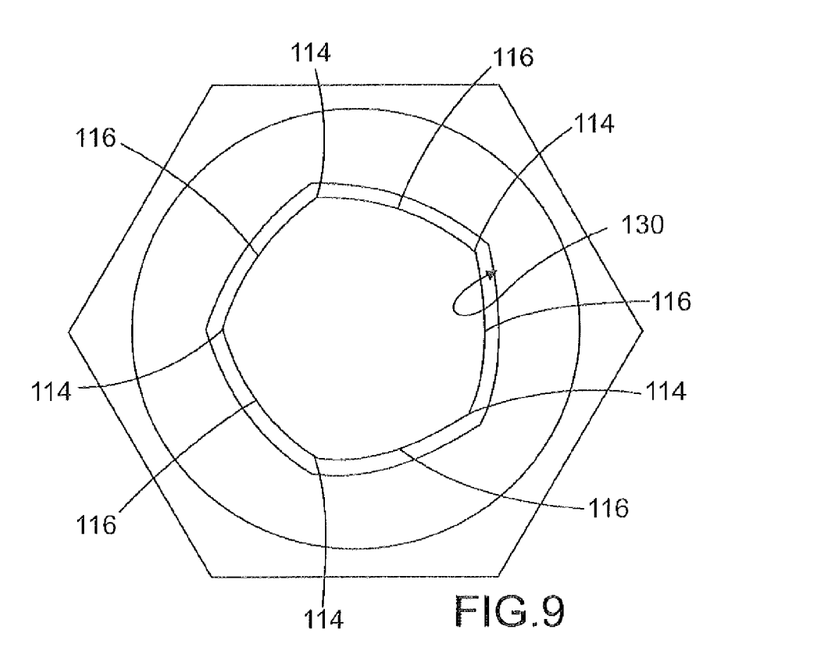
FIG. 9 is similar to FIG. 8, but shows the situation where the collar is provided as having a cylindrical bore.
Figure 10:
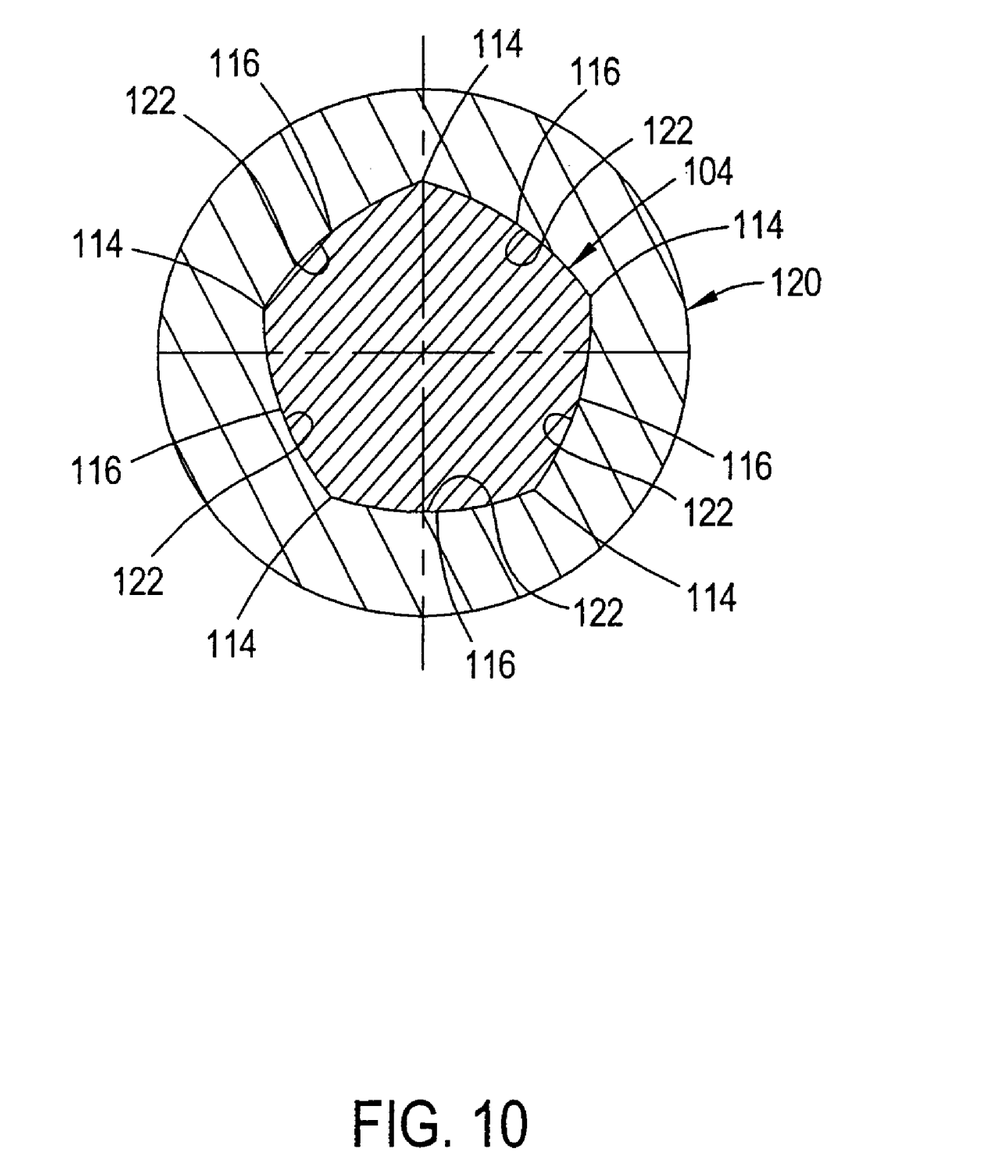
FIG. 10 provides a view (similar to a cross-sectional view) of the lockbolt and collar, after swaging.

For example, the threading may be provided as having five lobes or high points (such as is shown in FIGS. 8-10), such as an HP-5 thread as disclosed in U.S. Pat. Nos. 3,875,780 and 3,935,785, both of which are incorporated herein by reference in their entirety. Alternatively, the threading may be provided as having a number of lobes which are more or less than five. For example, the threaded portion may be provided as being quad-lobular (i.e., having four high points), tri-lobular (i.e., having three high points), an oval (i.e., having two high points), etc.

Regardless, the fact that the threaded portion 104 of the lockbolt 100 is multi-lobular, having high points and low points, provides that a collar 120, once swaged onto the lockbolt 10, does not tend to vibrate off. This is because vibration alone is not enough to cause low points 122 of the swaged collar 120 (see FIG. 10) to move past high points 114 of the multi-lobular portion 104 of the lockbolt 100. Simultaneously, the fact that the threaded portion 104 is, in fact, threaded and multi-lobular, provides that a collar 120 can be intentionally rotated off the lockbolt 100, if desired, by using a tool to apply enough torque to the collar 120.

FIGS. 5 through 7 illustrate installation of the lockbolt 100. The installation process is quite similar to the installation process which is used to install the lockbolt 10 shown in FIGS. 1 through 4. To install the lockbolt 100 shown in FIGS. 5 through 7, Textron Fastening Systems' Hydro-Electric Power Tool, Model T30 73412-02000, along with Textron Fastening Systems' HydraPac Hydraulic Power Unit, Model HP21 73401-02000, Model HP41 73400-02000 or Model HP51 73404-02000, can be used. Alternatively, some other appropriate installation tool can be used.

Initially, the frangible pintail 106 and threaded shaft 104 is inserted through apertures 24, 26 provided in two or more work pieces 28, 30, and a collar 120 is placed on the lockbolt 100, proximate the multi-lobular threaded portion 104. As shown in FIG. 8, the collar 120 can be provided as initially having a throughbore 130 which is multi-lobular or multi-faceted. Preferably, the collar 120 is provided as having a throughbore 130 which has a profile which corresponds to the profile of the multi-lobular portion 104 of the lockbolt 100. In other words, if the multi-lobular portion 104 of the lockbolt 100 is provided as having five lobes or high points (such as an HP-5 thread), preferably the collar 120 is provided as having a throughbore 130 which has five high points 131 as well. The fact that the collar 120 is provided as having a throughbore 130 which has a profile which corresponds to the profile of the multi-lobular portion 104 of the lockbolt 100 provides for uniform deformation of the collar 120 during swaging.

Additionally, the fact that the collar 120 is provided as having a throughbore 130 which has a profile which corresponds to the profile of the multi-lobular portion 104 of the lockbolt 100 provides that the collar 120 can assist with regard to installation. Specifically, the collar can be placed on the bolt and rotated slightly so that there is an interference fit between portion 104 and the throughbore 130 of the collar. Then, an installation tool can be brought into engagement with the pintail 106 and collar 120 to perform the swaging operation. Alternatively, as shown in FIG. 9, the collar 120 can be provided as initially having a throughbore 130 which is cylindrical, or some other shape.

Regardless, as shown in FIG. 5, an installation tool 140 is engaged with the collar 120 and the frangible pintail 106. Specifically, jaws 142 of the installation tool 140 grip and pull on the pintail 106 while an anvil 144 of the installation tool 140 pushes down on the collar 120, causing the collar 120 to swage down onto the bolt 100, as shown in FIG. 6. The swaging causes the collar 120 to deform and generally lock down onto the multi-lobular threaded portion 104 of the bolt 100 (FIG. 10 provides a view (similar to a cross-sectional view)) of the collar 120 swaged down onto the multi-lobular portion 104 of the lockbolt 100.

Preferably, the installation tool 140 swages only a portion 150 of the collar 120 down onto the threaded portion 104 (see FIG. 6) while the remaining portion 152 remains unswaged, as this renders the assembly easier to assemble and manufacture. Preferably, the portion 152 of the collar 120 which is not swaged includes a hex profiled surface 154 such that a standard hex tool can be used to subsequently remove the collar 120. Once the collar 120 has been swaged, the pintail 106 continues to be pulled until it breaks off, as shown in FIG. 7, leaving the bolt 100 installed in the work pieces 28, 30, secured by the collar 120. Similarly, if the lockbolt is of the type which does not include a frangible pintail, the threaded portion of the bolt is gripped and pulled as the collar is swaged, and once the collar has been swaged, the bolt is released.

Once the collar 120 has been swaged on the lockbolt, and the lockbolt 100 fully installed, secured by the collar 120, the collar 120 will not tend to vibrate off, due to the multi-lobular profile of the threaded portion 104. Specifically, vibration alone will not tend to provide that low points 122 of the collar 120 can overcome high points 114 of the multi-lobular portion 104 of the lockbolt 100, as shown in FIG. 10. In other words, the multi-lobular profile of portion 104 provides a certain amount of prevailing torque which tends to resist rotation in response to vibration. At the same time, the collar 120 can be intentionally removed merely by using a tool to apply enough torque (such as by using a hex tool to apply a torque to surface 154) such that the low points 122 of the collar 120 overcome the high points 114 of the multi-lobular portion 104 of the lockbolt 100.

Once the collar 120 has been swaged onto the lockbolt 100, intentional removal of the collar 120 (i.e., rotation of the collar 120 using a tool) causes a thread to be formed in the throughbore 130 of the collar. The thread which is formed in the collar 120 provides that the collar 120 can be easily rotated back onto the threaded portion 104 of the lockbolt 100 after the collar 120 has been intentionally removed therefrom. Subsequently, once the collar 120 has been rotated back onto the lockbolt 100, it is expected that the fact that the threaded portion 104 of the lockbolt is multi-lobular will result in the collar 120 not tending to vibrate off as much as if the threaded portion 104 of the lockbolt 100 were to be provided as being helically-threaded with standard helical threads, as is provided in the prior art (i.e., lockbolt 10 as shown in FIGS. 1-4). In other words, there is a certain amount of prevailing torque which exists over and beyond what would be provided if portion 104 had a standard helical thread.

While it was discussed above that the collar 120 is preferably initially provided with a hex surface 154 to facilitate removal of the collar 120 with a hex tool, the collar 120 can also initially be provided without such a surface, and such a surface can be formed on the collar 120, by the anvil 144 of the installation tool 140 during the swaging operation.

Figure 11:
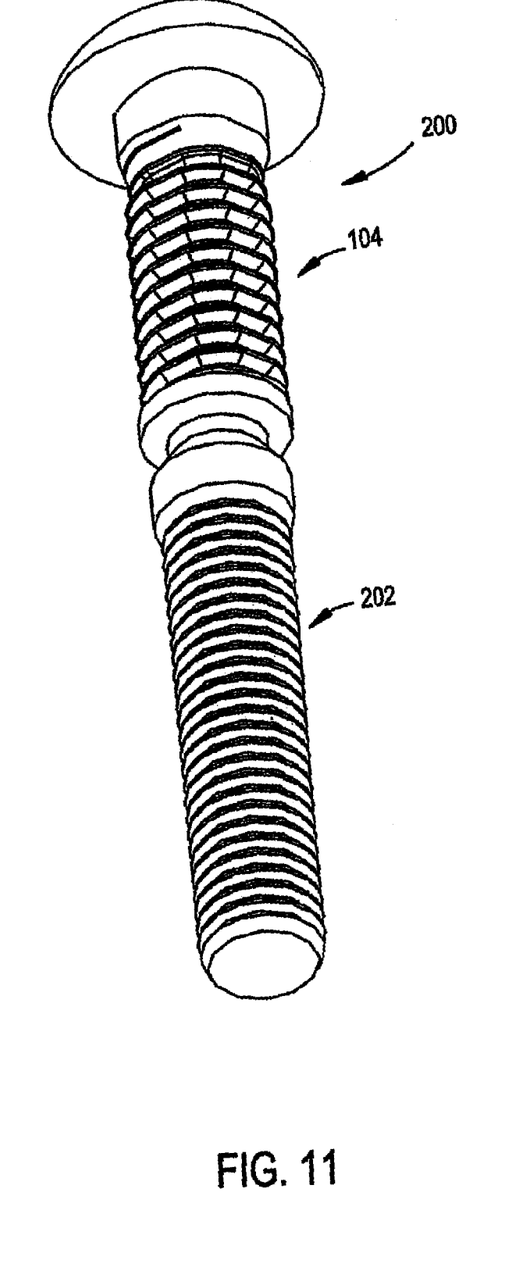
FIG. 11 is a perspective view of a lockbolt which is in accordance with an alternative embodiment of the present invention.

FIG. 11 illustrates a lockbolt 200 which is in accordance with an alternative embodiment of the present invention. The lockbolt 200 is very similar to the lockbolt 100 shown in FIG. 5 through 7, the only difference being that the frangible pintail 202 does not include annular ribs, but rather provides a multi-lobular threaded profile similar to the multi-lobular portion 104 of the lockbolt 200 (or lockbolt 100). This way, both the portion 104 of the lockbolt which ultimately receives the collar and the pintail portion 202 can be threaded at the same time, using the same thread-forming process. Alternatively, the pintail can be provided as having a helical, non-lobular thread.

While embodiments of the present invention are shown and described, it is envisioned that those skilled in the art may devise various modifications of the present invention without departing from the spirit and scope of the disclosure.

What is claimed is:

1. A lockbolt system comprising:
    a lockbolt which includes a head portion, a frangible pintail and a shaft which is disposed between the head portion and the frangible pintail, wherein the shaft includes a threaded portion which is threaded and has a multi-lobular cross-sectional profile; and
    a collar having a throughbore which has a multi-lobular cross-sectional profile which corresponds to the multi-lobular cross-sectional profile of the threaded portion of the shaft of the lockbolt, the collar further having a swageable portion and a non-swageable portion, the swageable portion including a cylindrical outer surface and being swageable onto the threaded portion of the shaft of the lockbolt, the non-swageable portion including a hex profiled outer surface,
    wherein because the threaded portion of the shaft of the lockbolt is threaded and multi-lobular, the threaded portion of the shaft provides that the collar is selectively rotatably removable and re-installable on the lockbolt upon a standard hex tool applying torque to the hex profiled outer surface of the non-swageable portion of the collar.

2. The lockbolt system as recited in claim 1, wherein the threaded portion of the shaft includes a plurality of high points.

3. The lockbolt system as recited in claim 1, wherein the threaded portion of the shaft includes five high points.

4. The lockbolt system as recited in claim 1, wherein the threaded portion of the shaft is configured to provide that a threaded nut is installable on the lockbolt once the swaged collar is removed from the shaft.

5. The lockbolt system as recited in claim 1, wherein the collar includes a throughbore which is multi-faceted, corresponding to the threaded portion of the shaft.

6. The lockbolt system as recited in claim 1, wherein the frangible pintail has a multi-lobular cross-sectional profile.

7. The lockbolt system as recited in claim 6, wherein the frangible pintail includes a plurality high points.

8. The lockbolt system as recited in claim 1, wherein the frangible pintail and the threaded portion of the shaft have identical threading.

* * * * *